United States Patent [19]

Rother et al.

[11] 4,405,398

[45] Sep. 20, 1983

[54] PROCESS FOR FASTENING A BASE PLATE TO A POLE PREPARED BY CENTRIFUGAL CASTING

[75] Inventors: Bruno Rother, Neumarkt; Hartmut Trommen, Postbauer-Heng, both of Fed. Rep. of Germany

[73] Assignee: G. A. Pfleiderer GmbH & Co., KG, Neumarkt, Fed. Rep. of Germany

[21] Appl. No.: 229,616

[22] Filed: Jan. 29, 1981

[30] Foreign Application Priority Data

Aug. 29, 1980 [DE] Fed. Rep. of Germany ....... 3032575

[51] Int. Cl.³ .............................................. B29C 5/04
[52] U.S. Cl. .................................. 156/242; 156/245;
156/304.2; 156/304.3; 264/248; 264/249;
264/257; 264/271.1; 264/275; 264/279;
264/279.1; 264/310; 264/311; 264/328.1
[58] Field of Search ...................... 156/242, 245, 304.2,
156/304.3; 264/35, 209.2, 248, 249, 251, 257,
258, 259, 261, 262, 269, 270, 271.1, 274, 275,
267, 279, 279.1, 310, 311, 312, 328.1; 138/109,
113, 143, 174; 362/431

[56] References Cited

U.S. PATENT DOCUMENTS

| | | | |
|---|---|---|---|
| 3,757,827 | 9/1973 | Seiwert et al. | 138/109 |
| 4,001,370 | 1/1977 | Baker et al. | 264/312 |
| 4,002,715 | 1/1977 | Usui | 264/259 |
| 4,154,266 | 5/1979 | Tanaka et al. | 138/109 |
| 4,340,553 | 7/1982 | Fosse | 264/267 |

*Primary Examiner*—Caleb Weston
*Attorney, Agent, or Firm*—Jordan and Hamburg

[57] ABSTRACT

A process for mounting a baseplate to a centrifugally cast, synthetic resin pole during the fabrication of the pole, the process comprising the steps of providing a mold having an inner wall the shape of which conforms to the outer surface of the pole and having a longitudinal end thereof open, providing a baseplate having a pipe connected centrally thereon and extending perpendicularly therefrom, attaching the baseplate to the mold such that the baseplate abuts the open end of the mold and such that the pipe extends within the mold and an annular gap is formed between the pipe and the inner wall of the mold, rotating the mold about its longitudinal axis, and injecting the synthetic resin into the mold in an amount sufficient to fill the annular gap. A baseplate for use in the mounting process is also disclosed.

5 Claims, 4 Drawing Figures

PROCESS FOR FASTENING A BASE PLATE TO A POLE PREPARED BY CENTRIFUGAL CASTING

BACKGROUND OF THE INVENTION

The invention relates to a process for mounting a baseplate to a pole comprising reinforced synthetic resin and formed by centrifugal casting within a mold. The baseplate is preferably fashioned of a rustproof material such as zinc coated steel, and is connected with a pipe extension which is oriented perpendicular to the baseplate and which is adapted to be disposed within the base of the pole such that the longitudinal axis of the pipe is substantially aligned with the longitudinal axis of the pole. Such a baseplate serves to fasten and secure the pole to pavement, bridges and other sturdy base supports.

Previous baseplates have been attached to poles with adhesives, which requires an additional fabrication step and thereby complicates production and increases production costs. Therefore, it is an object of the present invention to simplify the fabrication of such a pole prepared by centrifugal casting and the attachment of a baseplate thereto. It is a further object of the present invention to improve the bonding strength of the attachment of the baseplate to the pole. These objects are accomplished according to the present invention by releasable attaching the baseplate to the mold in which the pole is centrifugally cast such that the pipe extension connected thereto is substantially concentrically disposed within the mold and then injecting the synthetic resin within the mold while it is rotating such that the annular space between the mold inner wall and the pipe extension is filled with resin. Thus, the pole is made and the baseplate is fastened thereto in a single operation.

The fabrication process of the present invention obviates the need to finish the base end of the pole associated with previous pole fabrication and baseplate attachment processes. Furthermore, the instant fabrication process requires the additional step only of releasable attaching the baseplate to the mold, which mold may be a mold otherwise conventionally used for centrifugally casting poles comprising reinforced synthetic resin.

The fabrication process of the present invention may be utilized with a variety of centrifugal casting techniques used to form synthetic resin poles, including the techniques disclosed in our copending U.S. patent application Ser. No. 229,409 filed on Jan. 29, 1981, now U.S. Pat. No. 4,383,965, entitled "Centrifugal Process For The Production of A Pipe-shaped Body And A Pipe-shaped Body Produced According To The Centrifugal Process", the disclosure of which is hereby incorporated herein by reference.

Because poles manufactured by centrifugal casting are usually conical with the baseplate being fastened to the end of the pole with the greatest diameter, i.e., the base end, the synthetic resin sprayed into the mold runs along the inner wall of the rotating mold toward the base end where it reaches the annular gap between the mold inner wall and the pipe extension. The synthetic resin fills the gap and thereby causes the pipe extension, and consequently also the baseplate, to be firmly attached to the pole.

The baseplate may be fastened to the mold in various ways. It was found to be particularly advantageous to fasten the baseplate to a raceway of the mold located adjacent to the base end thereof. Since the baseplate is already provided with boreholes for anchoring screws, bolts or the like, it is contemplated that corresponding boreholes are provided in the raceway so that the baseplate can be secured by bolts or the like tightly to the raceway in a plane substantially perpendicular to the longitudinal axis of the mold.

The present invention also extends to a baseplate for the execution of the above-described process. Specifically, the baseplate is provided with an aperture communicating with the pipe extension interior. Such a construction allows the synthetic resin to be sprayed into the mold at the base end of the mold, through the aperture and the pipe extension, if desired.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
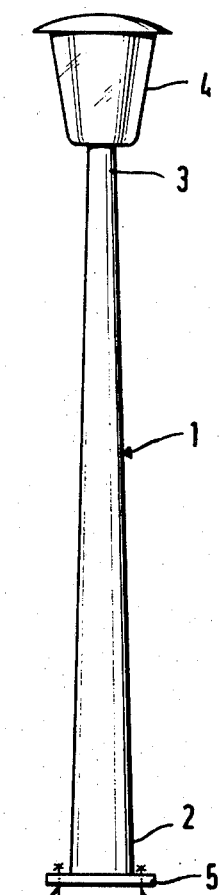
FIG. 1 is an illustration of a pole supporting a lamp with the pole mounted on a baseplate according to the present invention.
Figure 2:
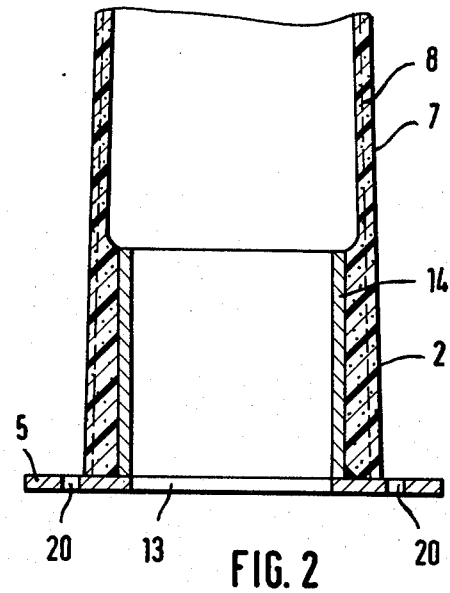
FIG. 2 is a partial cross-sectional view of the pole and the baseplate shown in FIG. 1 taken in a plane including the longitudinal axis of the pole.
Figure 3:
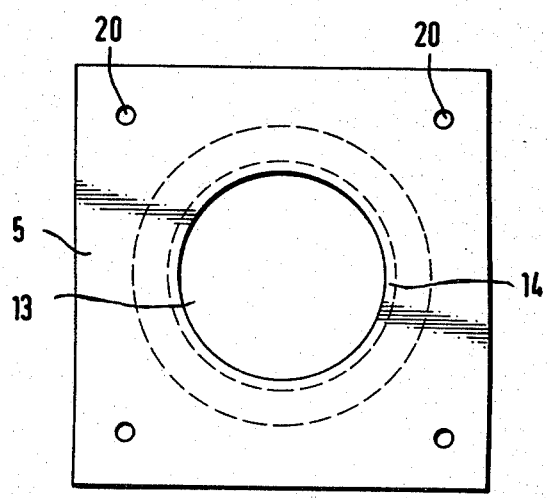
FIG. 3 is and end view of the baseplate shown in FIGS. 1 and 2.
Figure 4:
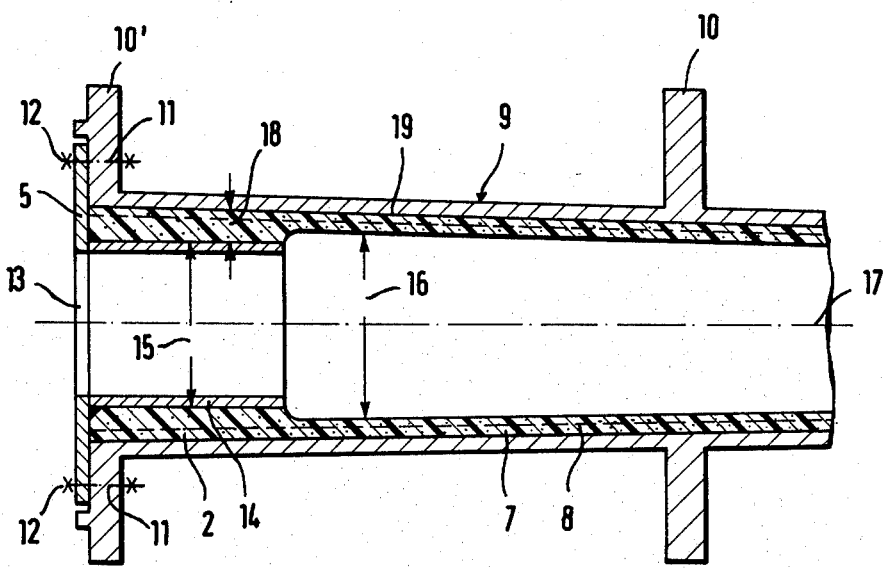
FIG. 4 is a simplified schematic representation of a centrifugal casting mold having a baseplate with connecting pipe extension attached to a raceway thereof and having the reinforced synthetic resin thereof.

As shown in FIG. 1, a pole 1 having a generally conical shape with a base end 2 and a top end 3 upon which is mounted a light 4 is attached to a baseplate 5, which in turn is secured in a well known manner by screws or bolts 6 to a firm base support. As shown in FIG. 2 and FIG. 4 the wall 7 of the pole 1 is fashioned of a synthetic resin with a reinforcement 8 comprising a material such as glass fibers and which may be fashioned according to the process disclosed in the aforementioned copending application Ser. No. 229,409, now U.S. Pat. No. 4,383,965.

To make such a conical pole, a conical rotational mold may be used. As represented in FIG. 4, the mold 9 is provided on its periphery with a plurality of spaced raceways 10,10' which are supported by corresponding support rollers (not shown) and which are pressed against the support rollers by corresponding track rollers (also not shown). At least one of the support rollers is operationally connected to a drive for rotating the mold 9 about its longitudinal axis.

The raceway 10' lying closest to the base end of the mold 9 is provided with a plurality of boreholes 11 corresponding in size, number and location to a plurality of boreholes 20 which are provided in the baseplate 5. The baseplate 5 is secured abuttingly to the base end of the mold 9 by aligning the boreholes 11 of the raceway 10' and the boreholes 20 of the baseplate 5 and inserting corresponding bolts 12 therethrough. When the baseplate 5 is provided with a centered aperture 13, the synthetic resin may be injected into the mold 9 through the base end thereof.

An extension 14 having an outer diameter 15 considerably smaller than the designed inner diameter 16 of the pole base end 2 at normal pole wall thickness is fastened to the baseplate 5 by welding or any other suitable means such that the baseplate aperture 13 communicates with the pipe extension interior. The pipe extension 14 extends substantially concentrically within the base end of the mold 9.

When the mold 9 is rotated about its longitudinal axis 17 after the reinforcement has been inserted therein and the synthetic resin has been injected therein by spraying or the like through either or both the base end or the top end of the mold 9, the synthetic resin settles along the inner wall of the mold 9 and accumulates until a sufficient wall thickness is built up. Due to the conical shape of the mold 9, some of the resin flows to the base end thereof where it reaches the annular gap 18 between the pipe extension 14 and the inner wall 19 of the mold 9. The resin completely fills the annular gap 18 so that a secure bond is formed between the pipe extension 14 and the baseplate 5 and the base 2 of the pole 1. the shrinking that accompanies the polymerization of the synthetic resin further secures such bonding, which is much greater than bonding achieved by using adhesives.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A process for mounting a baseplate to a pole comprised of a synthetic resin during the fabrication of said pole, the process comprising the steps of:
   (a) providing a mold having an inner wall the shape of which substantially conforms to the outer surface of said pole and having at least one longitudinal end thereof open;
   (b) providing a baseplate and a baseplate extension connected to said baseplate and extending substantially perpendicularly thereto and substantially centrally therefrom, said baseplate being wider than the open end of said mold and said baseplate extension being less wide than the inner wall of said mold;
   (c) inserting said baseplate extension into said mold through the open end thereof such that an annular gap exists between said baseplate extension and the inner wall of said mold;
   (d) placing said baseplate in a generally abuttiing relation with the open end of said mold;
   (e) securing said baseplate to said mold such that when said mold is rotated about its longitudinal axis, said baseplate and said baseplate extension also rotate about the longitudinal axis with a rotational velocity equal to the rotational velocity of said mold;
   (f) rotating said mold about its longitudinal axis; and
   (g) injecting the synthetic resin into said mold in an amount sufficient to substantially fill the annular gap between said baseplate extension and the inner wall of said mold and thereafter solidifying said resin to thereby effect bonding between said baseplate extension and said solidified resin.

2. A process for mounting a baseplate to a pole according to claim 1 wherein said baseplate extension comprises a pipe.

3. A process for mounting a baseplate to a pole according to claim 1 wherein said mold is provided with a raceway located adjacent to the open end of said mold and wherein the position of said baseplate and said baseplate extension is fixed relative to said mold by fastening said baseplate to said raceway.

4. A process for mounting a baseplate to a pole according to claim 2 wherein said baseplate is provided with an aperture communicating with the interior of said pipe.

5. A process for mounting a baseplate to a pole according to claim 1 further comprising shrinking said resin during said solidification of said resiin to further effect bonding between said baseplate extension and said solidified resin.

* * * * *